United States Patent [19]
Oba et al.

[11] Patent Number: 5,970,191
[45] Date of Patent: Oct. 19, 1999

[54] OPTICAL SIGNAL DISTRIBUTORS

[75] Inventors: Michio Oba; Yasunari Kawabata; Mitsuzo Arii; Kuniaki Jinnai, all of Tokyo; Nobuhiko Tsuji, Yokosuka; Takeshi Kobayashi, Hino, all of Japan

[73] Assignees: Mitsubishi Gas Chemical Co., Inc.; Fuji Electric Co., Inc., both of Japan

[21] Appl. No.: 08/827,421

[22] Filed: Mar. 27, 1997

[30] Foreign Application Priority Data

Mar. 27, 1996 [JP] Japan ................................. 8-072786

[51] Int. Cl.⁶ .............................................. G02B 6/26
[52] U.S. Cl. .................................... 385/47; 385/24
[58] Field of Search .............................. 385/24, 46–48, 385/43

[56] References Cited

U.S. PATENT DOCUMENTS

| | | | |
|---|---|---|---|
| 3,874,781 | 4/1975 | Thiel | 350/96 C |
| 4,864,489 | 9/1989 | Yasuhara et al. | 364/131 |
| 5,410,625 | 4/1995 | Jenkins et al. | 385/28 |
| 5,432,630 | 7/1995 | Lebby et al. | 359/152 |
| 5,570,442 | 10/1996 | Arii et al. | 385/46 |

FOREIGN PATENT DOCUMENTS

| | | |
|---|---|---|
| 0 324 493 | 7/1989 | European Pat. Off. . |
| 3-138606 | 6/1991 | Japan . |
| 3-156407 | 7/1991 | Japan . |

*Primary Examiner*—John D. Lee
*Assistant Examiner*—Victoria D. Hao
*Attorney, Agent, or Firm*—Sterne, Kessler, Goldstein & Fox, P.L.L.C.

[57] ABSTRACT

A reflective type optical signal distributor comprising, in a housing (2), a plurality of optical input/output units (3) functioning as input and output terminals for an optical signal, an optical circuit assembly (6) for reflecting and separating the optical signal, and a plurality of guide optical fibers (8) for connecting the plurality of optical signals entering any one of the plurality of optical input/output units (3) and the optical circuit assembly (6), whereby an optical input/output units (3) is substantially equally distributed to all other ones of the plurality of optical input and output units (3), the optical circuit assembly (6) comprising an optical circuit in which a plurality of independent branched optical waveguides (22) merge into a single main optical waveguide (21), a reflective surface (4) formed at an end of the main waveguide (21), and the plurality of guide optical fibers (8) being connected to the corresponding plurality of independent branched optical waveguides (22).

9 Claims, 6 Drawing Sheets

FIG.8A
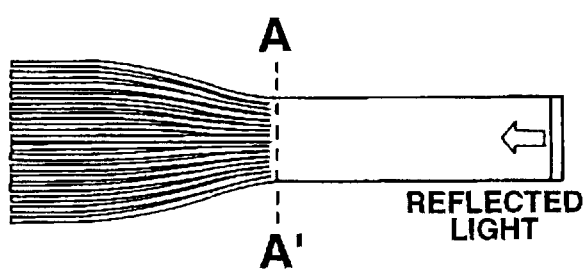
FIG.8B
FIG.9
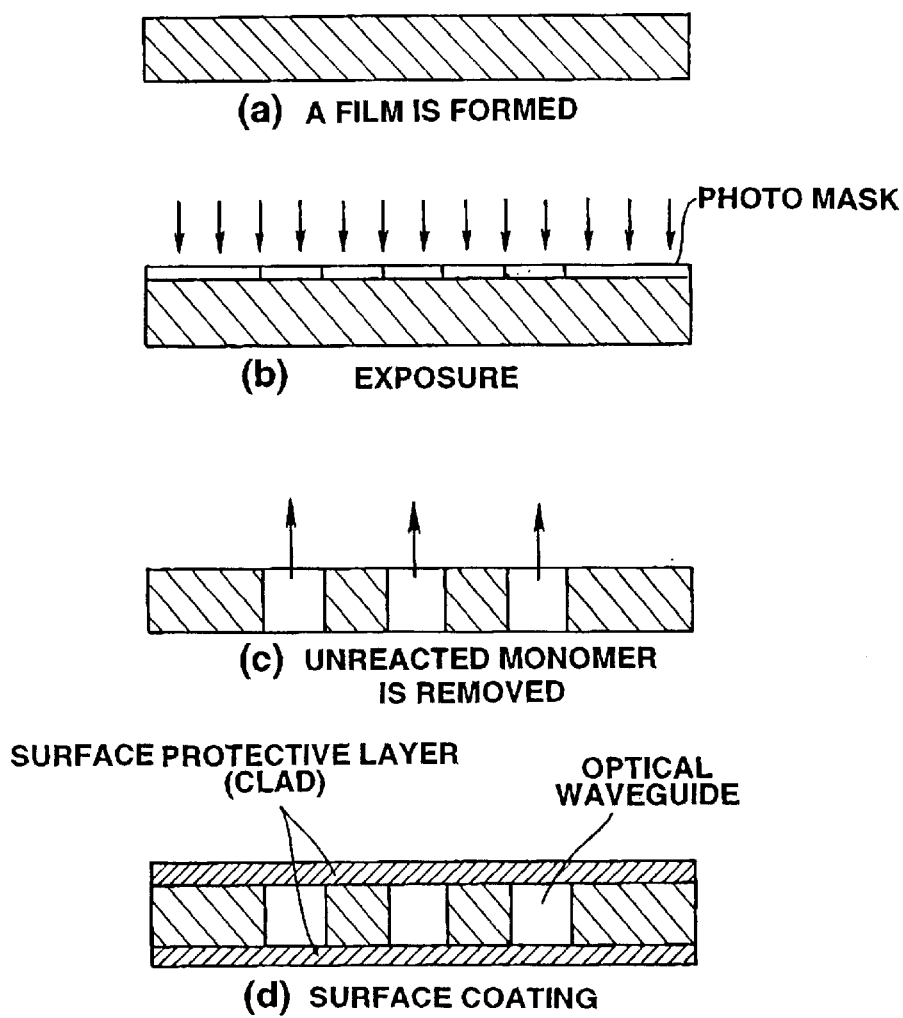

OPTICAL SIGNAL DISTRIBUTORS

BACKGROUND OF THE INVENTION

The present invention relates to optical signal distributors for use with an instrumentation system of an optical transmission type, and more particularly to an optical signal distributor for use with a field instrumentation system of an optical transmission type in which information from an plurality of field instruments installed on the field side is sent through an optical fiber transmission path and an optical signal distributor to a processor in a centralized control room.

Generally, a field instrumentation system applied to a chemical plant, a petroleum or a gas plant is comprised of a plurality of field instruments (for example, including pressure, flow and temperature measuring instruments and actuators such as openable/closable valves) installed in the field (spot) to send data between those field instruments and the central processing unit (controller) installed in the centralized supervision room or between those field instruments to supervise and control the respective plants. In order to send data in the system, optical fibers which (1) are not greatly influenced by electromagnetic noise, (2) exhibit high resistance to thunder (high insulation) and (3) are free from a danger of explosion are used as transmission paths, and an optical star coupler (especially, of a reflective type) is used as an optical signal distributor to send data (optical signal) between the central processing unit and each of the field instruments and between the field instruments.

FIG. 10 shows the structure of a system which uses a reflective type star coupler employing a mixing rod as an example of a conventional field instrumentation system. Reference numeral 90 denotes a controller; 97 a reflective type optical star coupler (optical signal distributor); 92 (92a–n) a field instrument; 93 and 94 (94a–94n) an optical fiber. Data transmission is possible between the controller and each of the field instruments and between the field instruments, using the reflective type optical signal distributor, various control operations are performed at high speed in a decentralized processing manner, and the system is fabricated at a low cost.

The reflective type optical signal distributor using the mixing rod will be described next in detail.

FIG. 11A is a perspective view of an example of the conventional reflective type optical signal distributor using the mixing rod.

The distributor 97 includes a flat mixing rod 96 which has thereto connected a plurality of optical fibers 8 at one end and a reflective plate 4 at the other end. Light entering the mixing rod 96 through any one of the optical fibers 8 is reflected by the reflective plate 4 and distributed to all the optical fibers 8. The mixing rod 96 has the functions of mixing the propagation modes of the incident light and reflected light from the reflective plate 4, and smoothing an optical intensity distribution at a cross section thereof, in other words, the function of equalizing an optical intensity distribution at a cross section of the mixing rod 96 to the utmost.

However, this conventional distributor has the defect that it will produce a large loss, which will next be described with reference to FIG. 11B which is a cross sectional view schematically indicative of connection of the mixing rod and the optical fibers.

In the reflective type optical signal distributor using the mixing rod, optical fiber claddings 73 of the optical fibers 8 are arranged so as to contact one to the other. The size of the cross section of the mixing rod 96 is designed so as to cover all the cores 72 of the optical fibers 8 to minimize a connection loss between the optical fibers 8 and the mixing rod 96. However, even when the connection loss is minimized so, most of light emitting from the fiber cores 72 enters the mixing rod 96, as shown in FIG. 11B, whereas a portion of the light exiting from the mixing rod 96 to the optical fibers 8 and impinging on the fiber claddings 73 and entering fiber spacings 98 are leaking components. Thus, such distributor necessarily has the defect that it will produce a large loss.

The mixing rod is not necessarily be flat, as described above, but may, for example, have a circular cross section. Even if the mixing rod may take any cross-sectional configuration, it is difficult to avoid leakage of light from the spacings between the optical fibers and from the fiber claddings.

Since in the optical transmission using the optical fibers, the optical fibers themselves produce an optical loss proportional directly to their length, their transmittable length is limited. Thus, when the distributor produces a large loss, the usable length of the optical fibers is shortened accordingly and the distance between field instruments connectable to the optical signal distributor is reduced. The conventional reflective type optical signal distributor using the mixing rod produces large leaking light and, hence, a large loss, so that its range of applications is limited.

It is therefore an object of the present invention to provide an inexpensive, low-loss, high branching accuracy, optical signal distributor for use in a field instrumentation system, the distributor (1) having an optical performance ever stabilized even when the temperature and humidity of its environment may change, (2) having an optical performance which is not or less deteriorated in an environment which contains a large amount of dust, organic substances, and/or corrosive gases, (3) having high environment resistance characteristic, (4) having high resistance to mechanical stresses such as vibrations and/or impacts, and (5) being easy to place on the spot.

SUMMARY OF THE INVENTION

In order to achieve the above object, the present invention provides a reflective type optical signal distributor comprising in a housing:

a plurality of optical input/output units functioning as input and output terminals for an optical signal;

an optical circuit assembly for reflecting and branching the optical signal; and a plurality of guide optical fibers for connecting the plurality of optical input/output units and the optical circuit assembly, whereby an optical signal entering any one of the plurality of optical input/output units is substantially equally distributed to all other ones of the plurality of optical input/output units;

the optical circuit assembly comprising an optical circuit in which a plurality of independent branched optical waveguides merge into a single main optical waveguide;

a reflective surface formed at an end of the main waveguide; and the plurality of guide optical fibers being connected to the corresponding plurality of independent branched optical waveguides.

The plurality of optical input/output units may be fixed to a side of the housing. The optical circuit assembly may comprise an optical circuit block which in turn comprises a flat optical waveguide and a pair of upper and lower reinforcement plates which hold the flat optical waveguide securely therebetween, and a reflective surface formed at one end of the optical circuit block. The plurality of guide optical fibers may be arranged and fixed at one end as an optical fiber array between (within) substrates and connected to the optical circuit block as a unit. The plurality of guide optical fibers may be also guided out of the optical fiber array and connected to the plurality of optical input/output units in one-to-one relationship. The connected optical circuit assembly and optical fiber array as a unit may be arranged within a case with the plurality of guide optical fibers being guided out of the case. The case may be filled with a sealing resin and fixed within the housing. The plurality of independent branched optical waveguides may be arranged at the same intervals as the plurality of guide optical fibers of the optical fiber array.

BRIEF DESCRIPTION OF THE DRAWINGS

FIG. 8A shows a main optical waveguide;

FIG. 8B is a graph of a reflected light intensity distribution in a main optical waveguide;

FIGS. 9a through 9d show a method of manufacturing a polymer optical waveguide, using a selective photopolymerization;

DESCRIPTION OF THE PREFERRED EMBODIMENTS

Preferred embodiments of an optical signal distributor according to the present invention will be described below in more detail with reference to the accompanying drawings. The embodiments are only as an example and should not be taken as limiting themselves and the scope of the invention, which are defined in the accompanying claims.

EMBODIMENT 1

Figure 1:
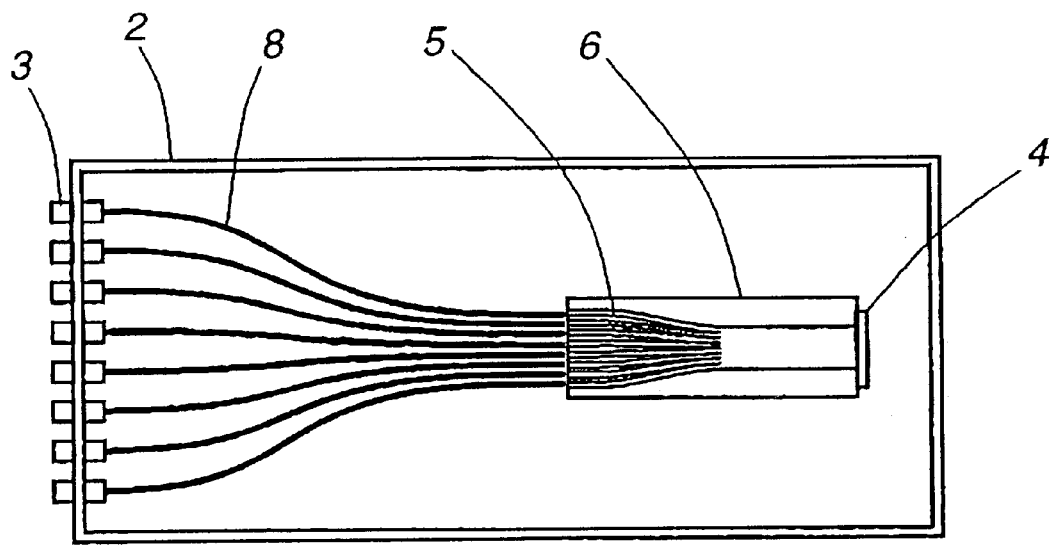
FIG. 1 is a schematic view of the basic structure of a reflective type optical signal distributor according to the present invention.

FIG. 1 schematically illustrates the basic structure of the optical signal distributor according to the present invention. The distributor 1 is comprised of a housing 2, a plurality of optical signal input/output units 3, a plurality of guide optical fibers 8, and an optical circuit assembly 6. The optical circuit assembly 6 is composed of an optical circuit block 5 in which a plurality of independent branched optical waveguides merge into a single main optical waveguide, and a reflective surface 4 formed at an end of the main optical waveguide side of the optical circuit block 5. An optical signal entering any one of the optical input/output units 3 is (1) guided through the corresponding guide optical fiber 8 to the optical circuit assembly 6, (2) reflected by the reflective surface 4, (3) distributed to all the branched optical waveguides, and (4) outputted again through the guide optical fibers 8 from all the optical signal input/output units 3.

EXAMPLE 2

Figure 2:
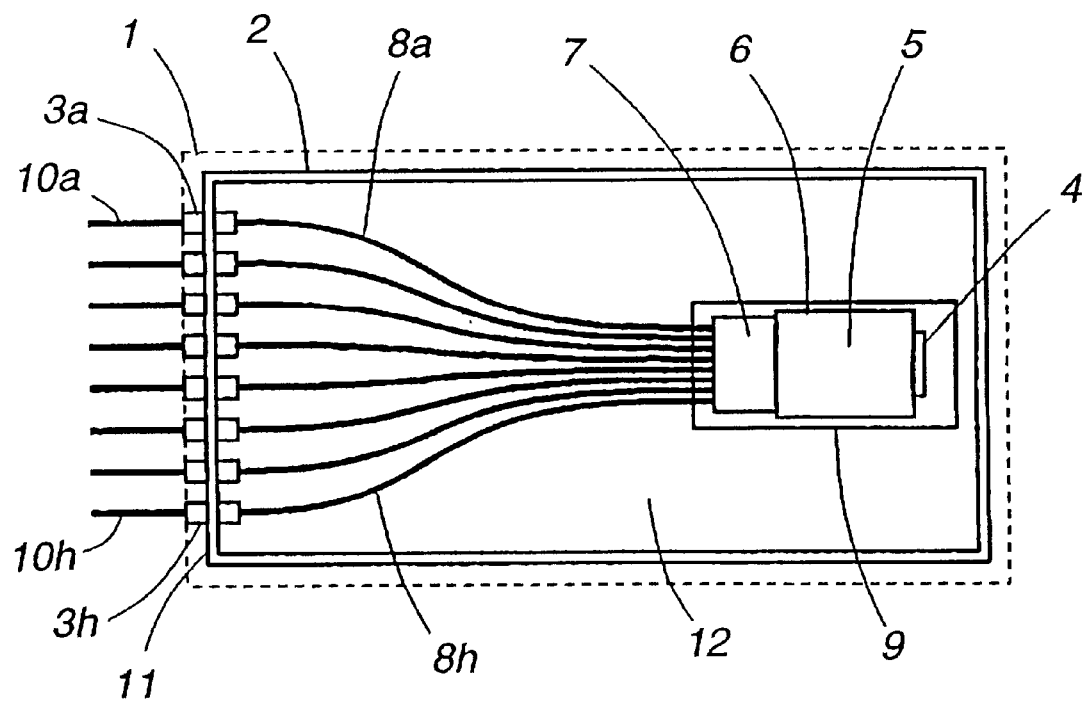
FIG. 2 is a whole structural view of a 8-branched optical signal distributor.

FIG. 2 shows the whole structure of the inventive optical signal distributor to which eight optical fibers are connected.

The distributor 1 has fixed to a side 11 of the housing 2 optical input/output units 3 (3a–h) functioning as input/output terminals for the optical signals. Optical fiber transmission paths 10 (10a–h) which are connected to the field instruments (not shown) and the processor (not shown) are externally connectable to the respective inputs/output units 3. The guide optical fibers 8 (8a–h) are internally connected at one end to the corresponding optical input/output units 3 (3a–h) while the guide optical fibers 8 (8a–h) take at the other end the form of an optical fiber array 7 disposed and fixed between (in) substrates with the array 7 being connected to an adjacent end of the optical circuit block 5 as a part of the optical circuit assembly 6.

As described above, the optical circuit assembly 6 is comprised of the optical circuit block 5 and the reflective plate 4. The optical circuit block 5 is comprised of the optical circuit which includes a flat optical waveguide in which the eight branched optical waveguides merge into the single main optical waveguide and is reinforced with a pair of plates in which the block 5 is sandwiched. The reflective plate 4 is connected to an end surface of the optical circuit block 5 on the side of the main optical waveguide to form the reflective surface.

The optical fiber array 7 and the optical circuit assembly 6 connected as a unit are accommodated in a case 9, from which the guide optical fibers 8 (8a–h) extend outward with the case 9 being fixed to a bottom 12 of the housing 2.

An optical signal entering one of the 8 optical input/output units of the distributor 1, for example, an optical input/output 3a, is guided to the optical circuit assembly 6 through the guide optical fiber 8a connected to the optical input/output unit 3a. It is reflected within the optical circuit assembly 6, distributed to all other optical guide fibers 8 (8b–h), and outputted from the respective optical input/output units 3 (3b–h).

In summary, the optical signal entering from any one of the optical input/output units 3 into the distributor 1 is distributed to all other optical input/output units 3 and then outputted.

The optical circuit 20 of the inventive distributor will be next described.

Figure 3:
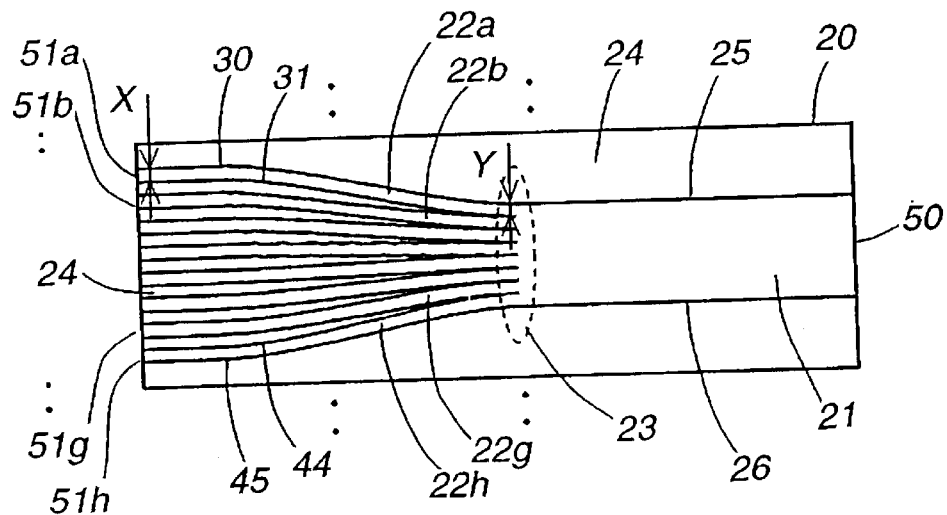
FIG. 3 is a schematic plan view of an 8-branched optical circuit.

FIG. 3 is a schematic plan view of the optical circuit 20 of the inventive distributor to which the eight optical fibers are connected.

The optical circuit 20 is comprised of a main optical waveguide 21 whose refractive index is higher than that of its outside area 24, as identified by boundary lines 25 and 26, branched optical waveguides 22 (22a–h) higher in refractive index than the outside area 24, as identified by boundary lines 30–45, and a merging area (or branching area) 23 in which the eight branched optical waveguides 22 (22a–h) merge together into the single main optical waveguide 21.

The reflective plate 4 is connected to an end 50 of the main optical waveguide 21 with the guide optical fibers 8 being connected to the corresponding ends 51 (51a–h) of the respective branched optical waveguides 22.

The light entering one branched waveguide 22 from the corresponding guide optical fiber 8 reaches through the merging area (branching area) 23 and the main optical waveguide 21 to the reflective plate, by which it is reflected or reversed in its direction of transmission, transmitted again through the main optical waveguide 21, and branched at the merging area (branching area) 23 to the respective optical waveguides 22 (22a–h) and coupled to the corresponding guide optical fibers 8 (8a–h).

Figure 4:
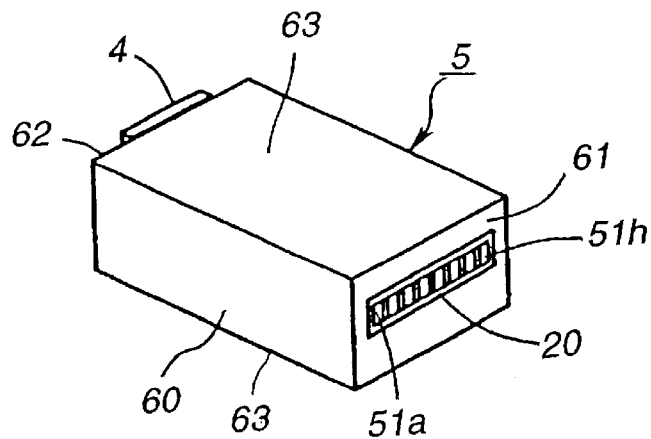
FIG. 4 is a schematic perspective view of the optical circuit assembly.

FIG. 4 is a schematic perspective view of the optical circuit block 5 of the inventive distributor.

The optical circuit 20 is fixed between reinforcement plates 60 to constitute the optical circuit block 5. Both opposite end faces 61, 62 of the optical circuit block 5 are polished together with the optical circuit 20 to expose the ends 51 (51a–h) of the branched optical waveguides 22 of the optical circuit 20 with the exposed ends 51 being connected to the corresponding optical fiber ends of the optical fiber array 7. The main optical waveguide end of the optical circuit 20 is exposed at the end 62 to which the reflective plate 4 is connected.

The optical circuit 20 is thus protected by an upper and a lower surface 63 of the reinforcement plate 60 and covered on its right and left sides with the optical fiber array 7 and the reflective plate 4.

Figure 5:
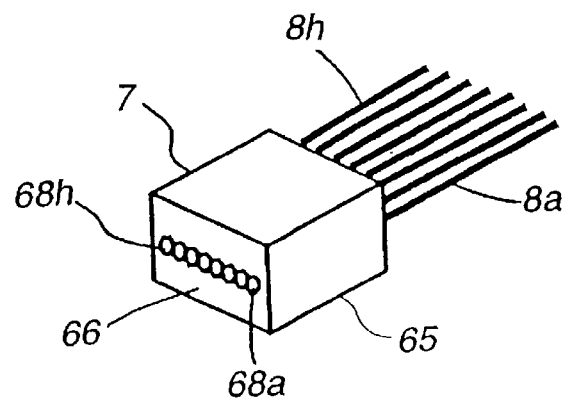
FIG. 5 is a schematic perspective view of an optical fiber array.

FIG. 5 is a schematic perspective view of the optical fiber array 7 of the inventive distributor.

The guide optical fibers a (8a–h) are disposed and fixed at one end within the substrate 65 with the guide fibers 8 extending from the substrate 65. The end 66 of the fiber array 7 is polished along with the ends of the guide fibers 8 so that the polished guide fiber ends 68 (68a–h) are exposed. As described above, the branched optical waveguides 22 and the guide fibers 8 are connected end to end in an aligning manner.

Figure 6:
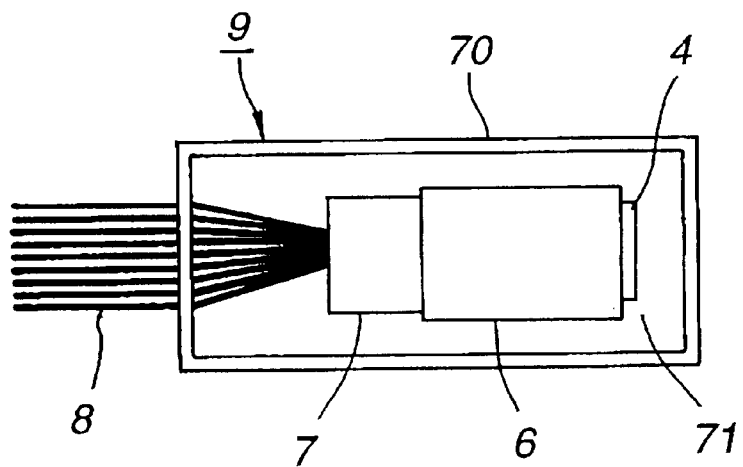
FIG. 6 is a schematic plan view of a protective accommodator.

FIG. 6 is a schematic plan view of the inside of protective case 9 which accommodates the connected optical circuit assembly 6 and optical fiber array 7.

Disposed within a case 70 are the optical circuit assembly 6 and the optical fiber array 7 with the guide fibers 8 extending outward from a side of the case 70. The case 70 is filled with a sealing resin 71, which fixes the circuit 6 and the array 7 within the case 70 and insulates two connecting surfaces, that is, the connecting surface of the optical circuit block 5 and the optical fiber array 7, and the connecting surface of the optical circuit block 5 and the reflective plate 4, from the air.

In the inventive distributor, the independent branched waveguides 22 are connected to the corresponding guide optical fibers 8. The width and thickness of the respective optical waveguides 22 are optimized to the size or dimensions (the diameter of the cores) of the guide fibers 8 to minimize a connection loss in the connection of the branched optical waveguides 22 and the respective guide fibers 8 with the loss being greatly low compared to the conventional optical signal distributor which employs the mixing rod.

A specified method of reducing the connection loss between the branched optical waveguides 8 and the corresponding branched optical fibers 22 is, for example, to design and fabricate the respective branched optical waveguides 22 so that their thickness and width are about 80% of the core diameter of the respective guide fibers 8 in the case of the optical branched waveguides having a rectangular cross sectional configuration, as disclosed in Published Unexamined Japanese Patent Application Hei 3-156407 involving the invention made by the present co-inventors.

Of course, in the present invention, the numerical aperture (NA) of each of the optical waveguides of the optical circuit 20 is substantially equal to that of guide fibers 8 to be used to thereby minimize a connection loss due to non-coincidence in NA between the branched waveguides and the guide fibers.

Thus, in the inventive distributor, light leakage from the fiber claddings and the spacing between the adjacent arranged optical fibers is greatly reduced to thereby reduce the connection loss greatly compared to the conventional distributor using the mixing rod.

In the optical circuit 20 of FIG. 3, the structure and dimensional accuracy of the merging area (branching area) 23 between the branched optical waveguides 22 (22a–h) and the main optical waveguide 21 are one of the most important factors which determine the optical performance of the inventive distributor.

Since the intensity of light applied to each of the optical waveguides 22 (22a–h) is substantially directly proportional to the width of the corresponding one of the branched optical waveguides in the merging area (branching area) 23, the respective branched waveguide widths Y in the merging area (branching area) 23 are the same so that the respective intensities of reflected light branched in the merging area (23) are distributed substantially equally to the respective branched optical waveguides 22 (22a–h).

When there are spacings each between any adjacent waveguides in the merging area (branching area) 23, the reflected light leaks from the respective spacings which produce a loss. Thus, the distributor is required to be fabricated such that the sum of the respective branched waveguide widths Y coincides with the main optical waveguide width, that is, the respective branched waveguides should be fabricated so as not to create spacings concerned in the merging area (branching area).

The main optical waveguide 21 of the optical circuit 20 has a fixed width defined by the two parallel straight lines as the boundary lines. The branched optical waveguides 22 (22a–h) are required to have a uniform width, and may be composed, for example, of two connected straight optical waveguides or a curved optical waveguide whose boundary lines is defined by two connected arcs.

The respective intervals at which the ends of the branched optical waveguides are arranged are designed and fabricated so as to be substantially equal to the interval at which the guide fibers are arranged, so that the guide fibers and the branched optical waveguides are advantageously connected collectively in an aligning manner.

In the inventive distributor, the optical circuit block, the connection between the reflective plate and the optical circuit block, and the connection between the optical circuit block and the optical fiber array are insulated from the air. Thus, a deterioration in the optical performance of the distributor is prevented even in an environment where there are large amounts of dust, organic substances and/or corrosive gas, and an optical performance stabilized long in spite of changes in the temperature and/or humidity of the air is ensured.

The optical circuit 20 and the guide fibers 8 are connected as a unit. The inventive optical signal distributor fixed and reinforced with the reinforcement plate, sealing resin, case and housing has high resistance to mechanical stresses such as vibrations and/or impacts, advantageously. In addition, the distributor is structured so that the optical circuit and/or connections directly receive no external stresses and suffers virtually no damages while the distributor is being placed or in operation. Furthermore, the optical fiber transmission medium 10 is easily connected from the outside of the housing 2 and the distributor thus is easily placed on the spot.

EXAMPLE 3

When the number of branched waveguides N increase extremely (for example, to more than 16) even in the inventive distributor which uses the optical circuit in which the N branched waveguides merge into the single main optical waveguide, the insertion loss varies greatly or the branching uniformity will be deteriorated.

The cause of the insertion loss varying greatly is that among N×(N−1) insertion losses produced when light enters N guide fibers and is received by (N−1) other guide fibers, the insertion losses in the guide fibers connected to outer branched waveguides are especially high. This derives from the fact that the reflected light propagating through the main optical waveguide takes an intensity distribution which is high at the center of the waveguide and decreases toward the edges of the waveguide, as shown in FIG. 8. In order to solve this problem, a method of improving the intensity distribution by increasing the length of the main optical waveguide was considered, but the loss would increase as a whole due to the light absorbing property of the optical waveguide material as the waveguide length increases, so that a high branching accuracy and a low loss can not be achieved together.

The inventors have discovered in the course of study of means for improving a distribution ratio of the optical signal distributor that high accuracy signal distribution is achieved without greatly impairing an (excess) loss in the optical signal distributor by connecting the guide optical fibers to central branched optical waveguides alone, using an optical circuit which has branched waveguides more than a target number with the outer branched waveguides being used as dummies.

The light distributed to the dummy branched waveguides will be a loss. Thus, the inventors studied the conditions of utilizing the effect of the dummies in a range in which the excess loss of the distributor was not unnecessarily reduced. As a result, the branching uniformity has been improved by fabricating an optical signal distributor which includes an optical circuit in which (N+2n) independent branched waveguides (n is a natural integer) merge into a single main optical waveguide with N guide fibers being connected to the N corresponding central branched waveguides and with 2n independent branched waveguides positioned on both outer sides being used as dummies.

In this method, all the respective widths of the (N+2n) branched waveguides are not required to be equal in width, the N inner ones alone are required to be equal in width, and the dummies and the N inner ones are not required to be equal in width to each other.

Optimal widths of the dummies and the optimal number 2n of dummies are required to be selected based on the relationship between branching uniformity and excess loss in accordance with the number of branched waveguides N in the distributor.

EXAMPLE 4

The inventors have further discovered that an effect similar to that produced in the case of the dummy waveguide will be produced by tapering off the branched waveguides when the inventors were studying another method of reducing variations in the insertion loss, more specifically, by reducing the width of each branched waveguide 22 from its end 51 toward the main optical waveguide 21, in the optical circuit 20 of FIG. 2.

As a result of a further study, the insertion loss was reduced as a whole and the branching uniformity was improved, by setting a ratio of Y/X so as to satisfy an inequality "$0.3 \leq Y/X < 1$" where X is the width of the branched waveguide end 51 and Y is the width of the branched waveguide in the merging area 23. The most preferable characteristic balance was obtained in a range of $0.4 \leq Y/X \leq 0.8$.

The inventors disclosed a method of improving a branching uniformity by tapering the respective branched waveguides of a propagation type optical signal distributor, for example, in Published Unexamined Japanese Patent Application No. Hei 3-138606. Any advantageous effects have not been known which will be produced by tapering the respective branched waveguides in a reflective type multi-branched waveguide signal distributor which employs a reflective plate and an optical circuit composed of a flat optical waveguide.

Tapering the branched optical waveguide widths from their ends toward the main optical waveguide and providing the dummy branched waveguides are applicable together to the signal distributors.

MEASURED EXAMPLES

Measured examples of the performance of the optical signal distributor as the embodiment of the present invention will be illustrated next and its advantageous effects will be described more specifically and in more detail.

Measured Example 1
Fabrication of an Optical Circuit

In order to fabricate a 8-branched optical signal distributor which uses grated optical fibers having a core diameter of $100\mu$, a cladding diameter of $140\mu$, and a NA of 0.26, a 8-branched optical circuit having dimensions indicated in TABLE 1 was fabricated in the selective photopolymerization, using bisphenol Z polycarbonate having a refractive index of 1.59 as a matrix polymer and trifluoro ethyl acrylate as an optical-reactive monomer.
Fabrication of an Optical Circuit Assembly Two glass plates were bonded to corresponding upper and lower surface of the optical circuit film, thus obtained, with a UV settable adhesive having a refractive index of 1.57. Both the opposite end surfaces of the resulting optical circuit film were then polished so that the main optical waveguide and the branched waveguides extend from one end surface and the other, respectively, of the resulting product. A reflective plate whose reflective surface was composed of a multi-layered dielectric film was bonded with a transparent adhesive to the surface of the product from which the main optical waveguide extended to thereby provide the inventive optical circuit assembly.
Fabrication of an Optical Fiber Array By removing coatings on ends of eight optical fibers to expose their respective claddings, arranging those fiber ends in an contacting manner between (within) the two glass substrates for the optical fibers, fixing the fiber ends therein with an adhesive, and polishing the ends of the guide optical fibers to expose their ends to thereby provide the optical fiber array.

Connection of the Optical Circuit Assembly and the Optical Fiber Array

The surface of the optical circuit assembly from which the branched optical waveguides are exposed and the surface of the optical fiber array from which the optical guide fibers are exposed are manipulated on an optical stage so that the branched waveguides and the guide fibers are aligned and bonded to each other with an optical adhesive.

Sealing

The connected optical circuit assembly and optical fiber array were disposed within a metal case having at one end guide holes through which the guide fibers extend, and the metal case was then filled with a silicon resin, which was then cured and fixed to the case.

Measurement

Optical connectors were then attached to the respective guide fibers, one of the optical connectors was then connected to a 0.85-$\mu$m wavelength LED source to emit light while the other guide fibers were connected to corresponding photodetectors to measure the respective light emission intensities. By changing the incident positions, similar measurements were made to measure 8×(8−1)=56 insertion losses. The branching uniformity and the excess loss were then calculated to provide the results of TABLE 2.

Measured Example 2

In order to fabricate a 16-branched optical signal distributor which uses grated optical fibers having a core diameter of 100$\mu$, a cladding diameter of 140$\mu$, and an NA of 0.26, an optical signal distributor including a 16-branched optical circuit having dimensions indicated in TABLE 1 was fabricated in the same manner as the distributor of Example 1 was. Two hundred and forty insertion losses were measured, using a method similar to that used in the Measured Example 1, and the branching uniformity and the excess losses were calculated to provide the result of TABLE 2.

Measured Example 3

In order to fabricate a 16-branched optical signal distributor which uses grated optical fibers having a core diameter of 100$\mu$, a cladding diameter of 140$\mu$, and an NA of 0.26, an optical signal distributor composed of a 18-branched optical circuit which includes dummies having dimensions indicated in TABLE 1 was fabricated in the same manner as the distributor of Example 1 was. No optical fiber was connected to either of the edges of the 18 arranged optical fibers. Two hundred and forty insertion losses were measured, using a method similar to that used in the Measured Example 1, and the branching uniformity and the excess loss were calculated to provide the result of TABLE 2.

Measured Examples 4–11

An optical signal distributor similar to that of the Measured Example 1 was fabricated, using a 16-branched optical circuit having the dimensions indicated in TABLE 1 in which the branched waveguides were tapered. Similarly, 240 insertion losses were measured, and the branching uniformity and the excess loss were calculated to provide the result of TABLE 2.

EXAMPLE 5

The optical circuit composed of optical waveguides used in the inventive optical signal distributor is not limited with reference to the material of the optical waveguides and the method of manufacturing the optical waveguides. The optical circuit of the inventive optical signal distributor is obtained, for example, by using a polymer optical waveguide produced by a selective photopolymerization (Japanese Patent Publication No. Sho 56-3522) or a glass optical waveguide produced by an ion exchange method (Izawa et al., "Applied Physics", 42, 38 (1973)).

Especially, the selective photopolymerization (FIG. 8) in which a polymer film containing a photo-reactive monomer is radiated with light through a photomask on which a circuit pattern is formed to thereby form an optical circuit is characterized in that a polymer optical circuit is easily produced which is optimal to the diameter and numerical aperture NA of the optical fibers, by adjusting the type and density of the photo-reactive monomer, as described in Unexamined Published Japanese Patent Application No. Hei 03-156407. Advantageously, according to this method, an optical circuit pattern of a photomask accurately produced is transferred to the polymer film with high precision and high yield, using an inexpensive manufacturing instrument.

From this point, the selective photopolymerization was optimal to a method of manufacturing an optical circuit for providing an inexpensive optical signal distributor as one of the objects of the present invention.

EXAMPLE 6

A high quality reflective surface of a high reflectance was easily obtained by using a reflective plate composed of a smooth substrate covered with a multilayered dielectric film, an evaporated gold film or an evaporated aluminum film, as the reflective surface of the inventive optical signal distributor. The angle $\theta$ contained between the optical circuit and the reflective surface is an important factor for guiding the reflected light efficiently into the main waveguide. As the angle $\theta$ reaches right angles, the efficiency is improved and the reflected light is distributed uniformly within the optical waveguides.

Alternatively, a reflective surface may be formed directly on the main waveguide end surface, in place of the reflective plate.

EXAMPLE 7

Figure 7A:
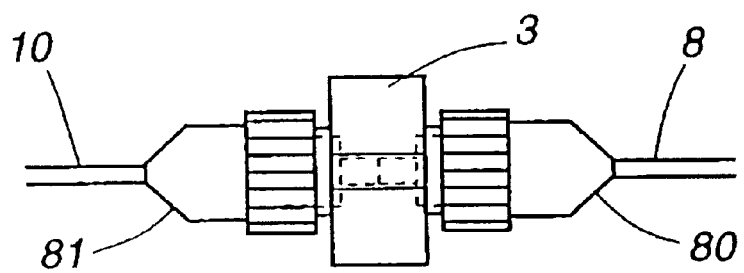
FIGS. 7a and 7b are schematic plan views of optical input/output units.

FIGS. 7A and B each are a plan view of the optical input/output units of the inventive optical signal distributor.

FIG. 7A shows a receptacle used as the optical input/output unit. Connectors 80 (80a–h) attached to the respective ends of the guide optical fibers 8 (8a–h) are connected to connectors 81 (81a–h) attached to ends of the external optical fiber transmission paths 10 (10a–h) within the corresponding receptacles. Advantageously, only by inserting the connectors into the respective receptacles, the guide optical fibers are connected with a low loss to the corresponding external optical fibers.

EXAMPLE 8

Figure 7B:
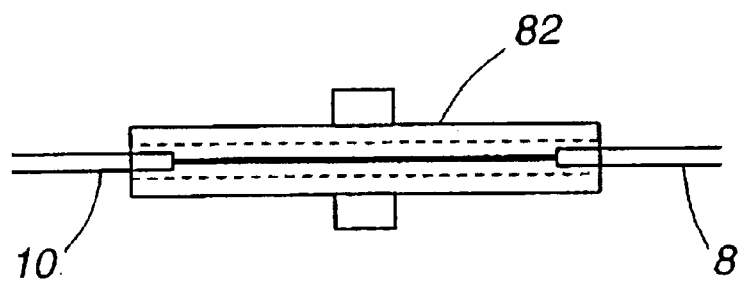
Figure 10:
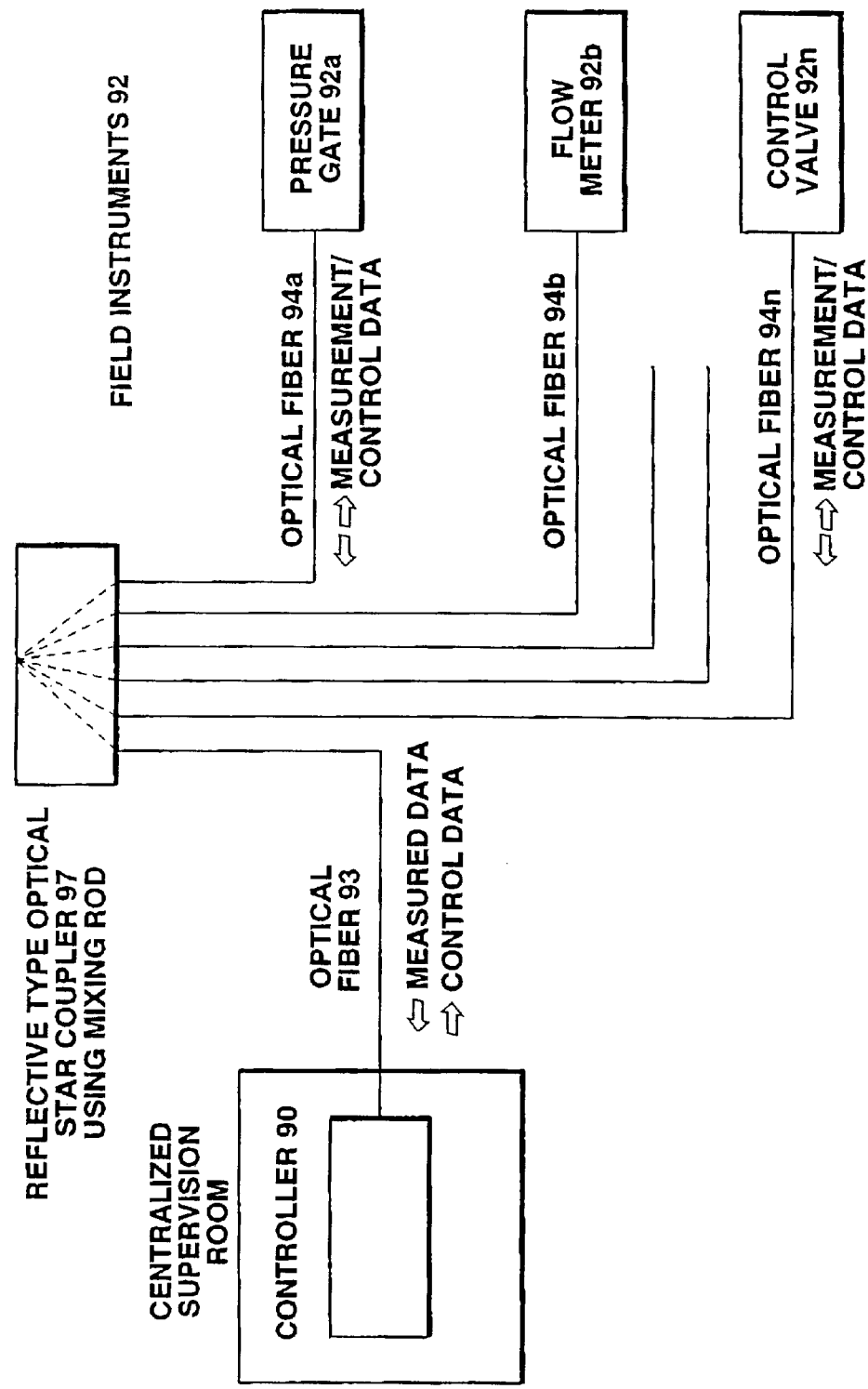
FIG. 10 shows the whole structure of a conventional field instrumentation system which uses a reflective type optical star coupler which employs a mixing rod.
Figure 11A:
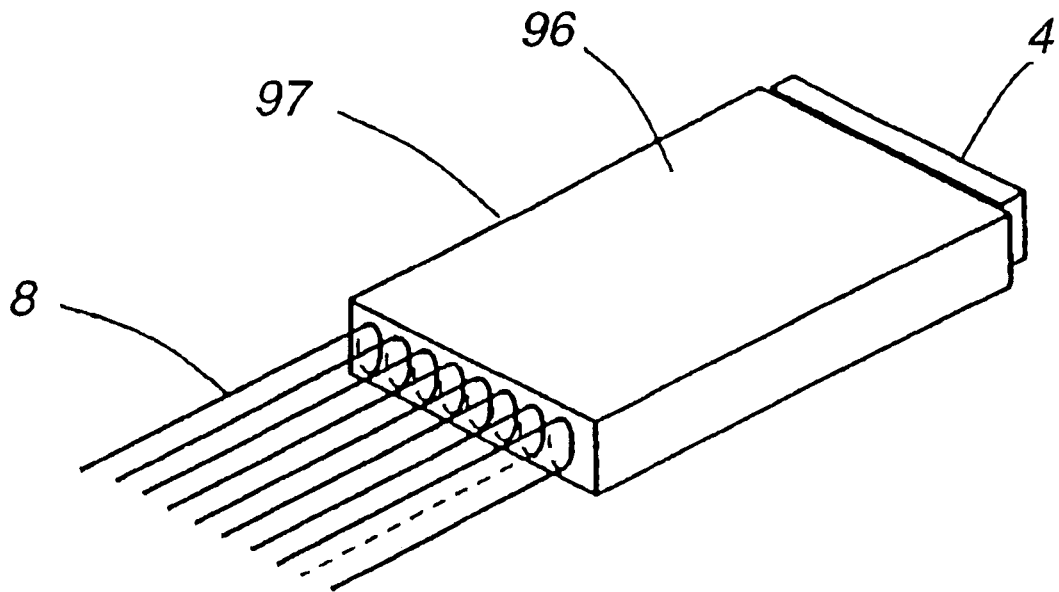
FIG. 11A shows a perspective view of a mixing rod and optical fibers.
Figure 11B:
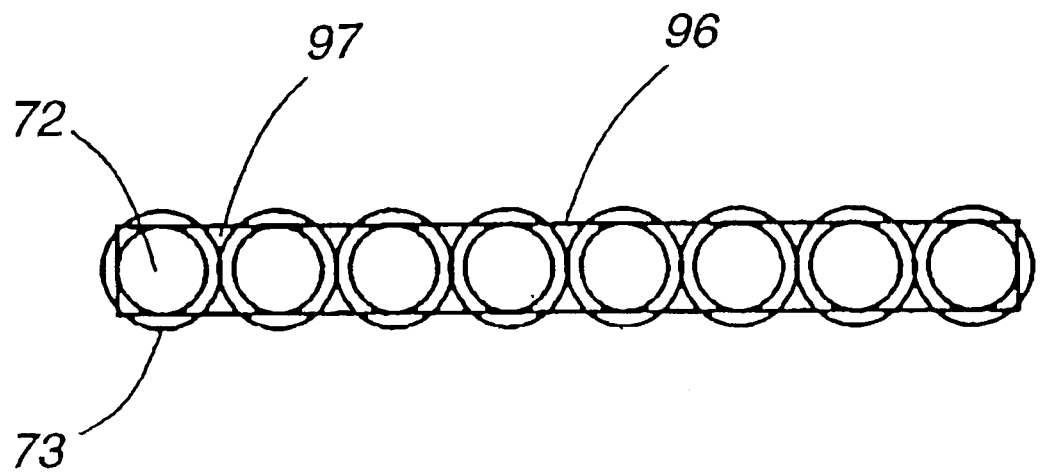
FIG. 11B is a cross-sectional view indicative of connection of the mixing rod and optical fibers.

FIG. 7B shows an optical input/output unit which include a corresponding protective tube 82 in which the optical fiber transmission path and the corresponding guide fibers are fused to each other. According to this method, the connection loss is further reduced compared to the receptacle employing system. In addition, a trouble such as an increase in the loss and/or the inability to transmit signals due to deposit of impurities or admixtures such as dust on the connection area is difficult to occur, advantageously.

The above-described terms involved in the optical loss and branching accuracy in the reflective type optical signal distributor having N branched waveguides in the above description are used in the following means.

When light having an intensity I0 (1) enters an mth port of the reflective type optical signal distributor, (2) is reflected by the reflective plate, (3) distributed to the (N−1) ports excluding the mth port, and (4) exits with an intensity In from an nth port, the insertion loss ILmn in each exiting port is defined as the next expression (1):

$$ILmn(\text{dB}) = -10 \times \log (In/I0) \quad (1)$$

An excess loss ILm produced when light having an intensity I0 enters an mth port is defined as:

$$ILm \text{ (dB)} = -10 \times \log\left[\left(\sum_{n \neq m} In\right)/I0\right] \quad (2)$$

"Maximum insertion loss" is the maximum one of the N×(N−1) insertion losses obtained in expression (1).

"Branching uniformity" represents the difference between the maximum and minimum ones of the N×(N−1) insertion losses.

"Excess loss" represents an average value of N excess losses produced when light enters from the first port to the respective Nth ports.

The inventive optical signal distributor is excellent in an optical performance such as a loss or a branching uniformity, has high reliability in the environment resistance characteristic and/or mechanical strength, and is fabricated at a low cost. Thus, it is optimal as a field instrumentation system.

TABLE 1

| | NUMBER OF BRANCHED WAVEGUIDES | BRANCHED WAVEGUIDE | | | | | MAIN WAVEGUIDE | | OPTICAL CIRCUIT THICKNESS $\mu m$ | NA |
|---|---|---|---|---|---|---|---|---|---|---|
| | | WIDTH X $\mu m$ | WIDTH Y $\mu m$ | TAPER RATIO | LENGTH $\mu m$ | INTERVAL $\mu m$ | WIDTH Z $\mu m$ | LENGTH $\mu m$ | | |
| MEASURED EXAMPLE 1 | 8 | 80 | 80 | 1.0 | 12000 | 140 | 640 | 12000 | 80 | 0.26 |
| MEASURED EXAMPLE 2 | 16 | 80 | 80 | 1.0 | 20000 | 140 | 1280 | 20000 | 80 | 0.26 |
| MEASURED EXAMPLE 3 | 18 | 80 | 80 | 1.0 | 20000 | 140 | 1440 | 20000 | 80 | 0.26 |
| MEASURED EXAMPLE 4 | 16 | 80 | 15 | 0.2 | 20000 | 140 | 256 | 20000 | 80 | 0.26 |
| MEASURED EXAMPLE 5 | 16 | 80 | 24 | 0.3 | 20000 | 140 | 384 | 20000 | 80 | 0.26 |
| MEASURED EXAMPLE 6 | 16 | 80 | 32 | 0.4 | 20000 | 140 | 512 | 20000 | 80 | 0.26 |
| MEASURED EXAMPLE 7 | 16 | 80 | 40 | 0.5 | 20000 | 140 | 640 | 20000 | 80 | 0.26 |
| MEASURED EXAMPLE 8 | 16 | 80 | 48 | 0.6 | 20000 | 140 | 768 | 20000 | 80 | 0.26 |
| MEASURED EXAMPLE 9 | 16 | 80 | 56 | 0.7 | 20000 | 140 | 896 | 20000 | 80 | 0.26 |
| MEASURED EXAMPLE 10 | 16 | 80 | 64 | 0.8 | 20000 | 140 | 1024 | 20000 | 80 | 0.26 |
| MEASURED EXAMPLE 11 | 16 | 80 | 72 | 0.9 | 20000 | 140 | 1152 | 20000 | 80 | 0.26 |

TABLE 2

| | NUMBER OF BRANCHED WAVEGUIDES | TAPER RATIO | MAX. INSERTION LOSS dB | BRANCHING UNIFORMITY dB | EXCESS LOSS dB |
|---|---|---|---|---|---|
| MEASURED EXAMPLE 1 | 8 | 1.0 | 11.5 | 1.5 | 1.8 |
| MEASURED EXAMPLE 2 | 16 | 1.0 | 16.0 | 4.2 | 2.5 |
| MEASURED EXAMPLE 3 | 18 | 1.0 | 15.4 | 2.1 | 2.8 |
| MEASURED EXAMPLE 4 | 16 | 0.2 | 16.5 | 2.0 | 3.6 |
| MEASURED EXAMPLE 5 | 16 | 0.3 | 15.9 | 1.5 | 3.3 |
| MEASURED EXAMPLE 6 | 16 | 0.4 | 15.1 | 1.4 | 2.5 |
| MEASURED EXAMPLE 7 | 16 | 0.5 | 14.9 | 1.3 | 2.4 |
| MEASURED EXAMPLE 8 | 16 | 0.6 | 14.7 | 1.6 | 2.1 |
| MEASURED EXAMPLE 9 | 16 | 0.7 | 14.7 | 1.8 | 2.1 |
| MEASURED EXAMPLE 10 | 16 | 0.8 | 14.8 | 2.1 | 2.0 |
| MEASURED EXAMPLE 11 | 16 | 0.9 | 15.5 | 2.5 | 2.4 |

What is claimed is:

1. A reflective type optical signal distributor having a housing comprising:
   a plurality of optical input/output units functioning as input and output terminals for an optical signal;
   an optical circuit assembly for reflecting and branching said optical signal, said optical circuit assembly comprising an optical circuit in which a plurality of independent branched optical waveguides merge into a single main optical waveguide;

a plurality of guide optical fibers for connecting said plurality of optical input/output units and said optical circuit assembly, whereby said optical signal entering any one of said plurality of optical input/output units is distributed substantially equally to all other ones of said plurality of optical input/output units; and a reflective surface formed at an end of said main optical waveguide;

wherein said plurality of guide optical fibers are pitched and are connected to said corresponding plurality of independent branched optical waveguides, said branched optical waveguides being pitched to match the pitch of the guide optical fibers; and wherein said plurality of independent branched optical waveguides are (N+2n) in number, where n is a natural integer, N is the number of said (N+2n) branched optical waveguides excluding n branched optical waveguides at each of both edges of said optical circuit and said N branched optical waveguides are connected to said respective guide optical fibers.

2. The reflective type optical signal distributor according to claim 1, wherein:

said plurality of optical input/output units are fixed to a side of said housing;

said optical circuit assembly comprises an optical circuit block which in turn comprises a flat optical waveguide and a pair of upper and lower reinforcement plates which hold said flat optical waveguide securely therebetween;

said reflective surface is formed at one end of said optical circuit block;

said plurality of guide optical fibers are arranged and fixed at one end as an optical fiber array between substrates and connected to said optical circuit block as a unit, wherein said unit is arranged within a case with said plurality of guide optical fibers being guided out of said case;

said plurality of guide optical fibers are guided out of said optical fiber array and connected to said plurality of optical input/output units in a one-to-one relationship;

said case is filled with a sealing resin and fixed within said housing; and said plurality of independent branched optical waveguides are arranged at the same intervals as said plurality of guide optical fibers of said optical fiber array.

3. The reflective type optical signal distributor according to claim 1, wherein each of said branched optical wave guides tapers from one of its ends toward said main optical waveguide so as to satisfy the following relationship:

$$0.3 < Y/X < 1$$

where X is the width of said end of each of said branched waveguides and Y is the width of each of said branched waveguides at the area where said plurality of branched waveguides merge into said main waveguide.

4. The reflective type optical signal distributor according to claim 1, wherein said optical circuit is produced by irradiating a polymer film including a photo-reactive monomer with light through a photomask on which an optical circuit pattern is formed.

5. The reflective type optical signal distributor according to claim 1, wherein said reflective surface comprises a smooth substrate covered with a multi-layered dielectric film.

6. The reflective type optical signal distributor according to claim 1, wherein each of said optical input/output units comprises an optical receptacle in which an optical connector attached to an end of each of said guide optical fibers is connected to an optical connector attached to an end of an external optical fiber transmission path.

7. The reflective type optical signal distributor according to claim 1, wherein each of said optical input/output units comprises a protective tube in which an end of each of said guide optical fibers is fused and connected to an end of an external optical fiber transmission path.

8. The reflective type optical signal distributor according to claim 1, wherein said reflective surface comprises a smooth substrate covered with an evaporated gold film.

9. The reflective type optical signal distributor according to claim 1, wherein said reflective surface comprises a smooth substrate covered with an evaporated aluminum film.

* * * * *